US 8,385,594 B2

(12) United States Patent
Hofmann et al.

(10) Patent No.: US 8,385,594 B2
(45) Date of Patent: Feb. 26, 2013

(54) METHOD AND APPARATUS FOR DETERMINING THE POSITION OF A VEHICLE, COMPUTER PROGRAM AND COMPUTER PROGRAM PRODUCT

(75) Inventors: Hilmar Hofmann, Hemsbach (DE); Rüdiger Opper, Bobenheim-Roxheim (DE); Martin Kirsch, Mannheim (DE)

(73) Assignee: Pepperl +Fuchs, Mannheim (DE)

( * ) Notice: Subject to any disclaimer, the term of this patent is extended or adjusted under 35 U.S.C. 154(b) by 806 days.

(21) Appl. No.: 12/207,589

(22) Filed: Sep. 10, 2008

(65) Prior Publication Data

US 2009/0067673 A1 Mar. 12, 2009

(30) Foreign Application Priority Data

Sep. 12, 2007 (DE) .................. 10 2007 043 498
Sep. 12, 2007 (DE) ................ 20 2007 012 798 U
Mar. 19, 2008 (EP) ..................... 08005213

(51) Int. Cl.
*G06K 9/00* (2006.01)
(52) U.S. Cl. ........................ 382/103; 382/104
(58) Field of Classification Search ............. 382/103
See application file for complete search history.

(56) References Cited

U.S. PATENT DOCUMENTS

| 3,842,923 | A | 10/1974 | Moore |
| 4,363,369 | A | 12/1982 | Susor |
| 2005/0169501 | A1* | 8/2005 | Fujii et al. ............. 382/104 |
| 2006/0038895 | A1* | 2/2006 | Suzuki et al. ............. 348/222.1 |

FOREIGN PATENT DOCUMENTS

| DE | 3150977 A1 | 6/1983 |
| DE | 199 10 933 A 1 | 9/2000 |
| DE | 19910933 A1 * | 9/2000 |
| DE | 100 12 830 A1 | 9/2001 |
| DE | 103 41 297 B3 | 7/2005 |
| DE | 10 2004 018 404 A1 | 11/2005 |
| DE | 10 2006 010 161 A1 | 8/2007 |
| EP | 0 479 078 A2 | 4/1992 |
| EP | 1 099 936 A1 | 5/2001 |
| JP | 58078935 A | 5/1983 |

(Continued)

OTHER PUBLICATIONS

PCT, "International Preliminary Report on Patentability", pp. 1-5, Date of Issuance of Report Jan. 13, 2009.

(Continued)

*Primary Examiner* — Bhavesh Mehta
*Assistant Examiner* — Nirav G Patel
(74) *Attorney, Agent, or Firm* — Hoffman Warnick LLC

(57) ABSTRACT

The present invention relates to an apparatus and a method for determining the position of a vehicle moved along a path, markers, particularly code carriers or barcodes being located along the path. The method is characterized in that the markers are detected with a digital camera placed on the vehicle and that by means of image processing from a position of at least one marker image in the detection or coverage range of the digital camera a position of the vehicle relative to the given marker or the given markers in the main vehicle movement direction along the path and in at least one direction at right angles to the main movement direction is determined. The invention also relates to a computer program and a computer program product.

14 Claims, 3 Drawing Sheets

FOREIGN PATENT DOCUMENTS

| | | | |
|---|---|---|---|
| JP | 61059507 | A | 3/1986 |
| JP | 62116499 | A | 5/1987 |
| JP | 62263511 | A | 11/1987 |
| JP | 5158148 | A | 6/1993 |
| JP | 8083124 | A | 3/1996 |
| JP | 2001134318 | A | 5/2001 |
| JP | 2001282354 | A | 10/2001 |
| JP | 2004257003 | A | 9/2004 |
| JP | 2004298977 | A | 10/2004 |
| WO | 2005092632 | A1 | 10/2006 |

OTHER PUBLICATIONS

European Search Report, EP Application No. EP 08 00 5213, Completion Date Aug. 5, 2008, pp. 1-2.

PCT, "Notification Concerning Transmittal of International Preliminary Report on Patentability", International Application No. PCT/DE2007/000327, Dated: Sep. 11, 2008.

Kallinger, EP Application No. EP 08 00 5213, Search Report, Jul. 1, 2009, 2 pages.

* cited by examiner

METHOD AND APPARATUS FOR DETERMINING THE POSITION OF A VEHICLE, COMPUTER PROGRAM AND COMPUTER PROGRAM PRODUCT

TECHNICAL FIELD

In a first aspect the present invention relates to a method for determining the position of a vehicle.

In a further aspect the invention relates to an apparatus for determining the position of a vehicle.

The invention also relates to a computer program and a computer program product.

RELATED ART

Such a method is e.g. disclosed by DE 199 10 933 A1, where a vehicle can run along a path or way, which can basically pass along a random curve, and for position determination purposes one-dimensional barcodes are placed along the path as markers.

The invention more particularly relates to vehicles such as suspended monorails, stacker cranes, crane installations or other displaceable equipment, which can move along a path or on or parallel to a predetermined surface.

Further positioning methods are described in EP 0 039 921 A2, DE 38 25 097 A1, EP 0 116 636 A1, DE 39 10 873 A1, DE 42 09 629 A1 and DE 43 09 863 C1, said known systems suffering from the disadvantages indicated hereinafter.

The attainable precision of the position determination is limited through the length of the code marks or their elements, because the code elements are lined up in one or more parallel tracks along the roadway and must be successively scanned on movement. The packing density of the code elements on the code support cannot be exceeded beyond a certain amount, because the spatial resolution of the scanning elements, e.g. light barriers is limited. Thus, the length of the code carriers cannot be reduced to below a certain minimum value, so that there are limits on positional resolution.

Moreover, for the continuous coverage of a long roadway with an adequate longitudinal resolution it is necessary to have a large number of code carriers and therefore, if the code content is not to be repeated along the roadway, a correspondingly large word width of the code. However, an increasing word width not only leads to a very rapid rise in the length of the individual code carriers, but also in the costs and expenditure for the code readers.

In addition, longer code carriers result in a reduced resolution of the position determination, so that it is difficult with adequate resolution to implement roadways of several kilometres, which can e.g. be desired or necessary in modern industrial production lines. This problem is made worse if it is necessary to have redundant informations on the code carriers in order to improve the reliability of the system, e.g. its resistance to contamination or damage to parts of the code carrier and as a result reduce the risk of failures or, in certain circumstances faulty positionings which lead to serious consequences.

Another disadvantage of said systems is that a position determination is not readily possible with the vehicle stationary. Those systems operating in a transmitting light procedure are also mechanically complicated and susceptible to code carrier deformations. Some of the aforementioned systems are also very sensitive to a change in the orientation of the code carrier relative to the code reader.

SUMMARY OF THE INVENTION

It can therefore be looked upon as an object of the invention to provide a method and an apparatus which permit an improved positional resolution and longer roadways. It is also necessary to provide an information as to whether and optionally how far the vehicle differs from a normal path. In addition, a suitable computer program is to be given.

The method of the aforementioned type is inventively further developed in that the markers are detected with a digital camera placed on the vehicle and that by image processing from a position of at least one marker image in the detection area of the digital camera determination takes place of a position of the vehicle relative to the given marker or the given markers in the direction of a main vehicle movement direction along the path and in at least one direction at right angles to the main vehicle movement direction.

The apparatus of the aforementioned type is inventively further developed by a digital camera to be placed on the vehicle for detecting markers positioned along the path and a computing device connected to the digital camera which is set up for determining a position of the vehicle relative to at least one marker in the main movement direction of the vehicle along the path and at least one direction at right angles to the main movement direction by means of image processing from a position of the image of the given marker or the given markers in a detection area of the digital camera.

Preferred variants of the inventive method and advantageous developments of the inventive apparatus form the subject matter of the dependent claims.

According to the invention it has firstly been recognized that with the aid of an image processing method it is possible to very precisely determine the position of a vehicle, in that the position or location of a specific marker in a detection area of a digital camera is determined and evaluated.

The inventive method, which can be a reflected or incident light method, more particularly permits a provision of a position information for a stationary vehicle.

An important advantage of the invention is that unlike the prior art methods it is possible to carry out a position determination at right angles to the travel or movement direction.

The position information at right angles to the travel direction can in particular be advantageous for an automatic compensation of temperature or load change-caused bending deformations.

Another advantage of the invention is that hitherto necessary scanning elements, e.g. light barriers, which are susceptible to disadjustments and contamination and which are therefore maintenance-intensive, are no longer required. This advantage is particularly important where a position determination at right angles to the travel direction has to be carried out at different path locations and for which hitherto numerous scanning elements have had to be juxtaposed.

The markers can fundamentally be all graphically displayable coding and marking types, whose structures and therefore the information contained therein can be identified and evaluated with a digital camera.

Preferably use is made of barcodes, particularly two-dimensional barcodes.

So that an established relative position with respect to a given marker can be clearly associated with a specific absolute vehicle position, it is also preferable if the markers used differ, i.e. can be clearly differentiated by image processing.

The range of detectable position changes at right angles to a main vehicle movement direction is increased if the markers are arranged in several rows along the path.

The digital camera can be constituted by all known, available components, e.g. it can be a digital camera with a CCD or CMOS receiver chip.

In a particularly preferred variant of the inventive method position changes of the vehicle at right angles to the main movement direction of the vehicle are determined on the basis of shifts of the marker images in the detection area of the digital camera. Such shifts, which e.g. occur if the vehicle moves laterally with respect to the main movement direction and in the case of a substantially constant distance from the path, can be easily established and quantitatively evaluated using image identification and image evaluation methods. The main movement direction is referred to as the x-direction. The direction considered here laterally with respect to the main movement direction is called the y-direction.

Additionally or alternatively it is possible to determine distance changes of the vehicle relative to the path from changes in the size of the marker images. Such distance changes of the vehicle relative to the path correspond to a vehicle movement in the z-direction.

In order to be able to better evaluate and associate established measured values, preferably when a system is put into operation for the first time at least one reference run is made, in which relative positions of the vehicle in at least one direction at right angles to the main movement direction associated with the relative positions of the vehicle in the main movement direction are recorded and stored.

In an easily implemented variant, e.g. error signals are outputted, if the values determined for the relative positions of the vehicle in directions at right angles to the main movement direction leave predetermined tolerance intervals.

In a particularly preferred development of the inventive method it is possible to determine a weight of a load supplied to the vehicle on the basis of shifts of marker images in the digital camera detection or coverage area or range. Therefore the measuring device can be used at the same time as a weighing means for vehicles which are intended to transport loads. It is appropriate for this purpose to couple the digital camera with a component of the vehicle, which is elastically deformable when the vehicle is supplied with a load to be transported.

In a simple variant the digital camera can e.g. be coupled to a spring, which is mounted on a base frame or base support of the vehicle.

With particular advantage the inventive method and the inventive apparatus can be used on vehicles, which move on their path with rollers or runners, which in time are subject to wear and have to be replaced. This is on the one hand intended to prevent a failure of the rollers and therefore the vehicle and on the other it must be possible to use the rollers up to the end of their service life.

For this purpose and in a particularly advantageous variant of the inventive method wear to the rollers is determined on the basis of shifts of marker images in the digital camera detection area.

This method variant can in particular be used if weighing is to be carried out when a load is applied to the vehicle.

The inventive method can also be performed in such a way and the inventive computer program can be correspondingly formed so that no identification of the individual markers takes place on evaluation. The position information is then obtained by counting identified characteristic structures, e.g. by counting identified edges.

In such method variants the position information can be made particularly rapidly available, because for identification of only the characteristic structures relatively few pixels can prove adequate.

The prerequisite is that the marker spacings are known. As a rule the markers are equidistantly arranged along the path.

For the identification and evaluation of barcodes with the aid of image-processing methods, it is appropriate for the distance between individual two-dimensional barcodes to be at least as large as the smallest structure occurring in the barcodes, i.e. at least as large as a minimum information unit, particularly as large as one bit of the two-dimensional barcode.

In principle it can be adequate to determine the position of the vehicle relative to the given marker from the established marker images in the detection range of the digital camera. In a further development of the inventive method an absolute position of the vehicle, e.g. relative to a specific point in a factory can be determined from the position relative to a specific marker and a known absolute position of said marker. The absolute position can be directly outputted and e.g. transmitted to further components by a computer-programmable control unit.

The computing and evaluating steps of the inventive method are preferably performed on the computing device as a computer program. In fundamentally known manner said computer program can be stored on a computer-readable data support, particularly in a ROM of a microcontroller or a programmable logic module.

BRIEF DESCRIPTION OF THE DRAWINGS

Further advantages and features of the invention are described in greater detail hereinafter relative to the attached diagrammatic drawings, wherein show.

DETAILED DESCRIPTION OF THE INVENTION

Figure 1:
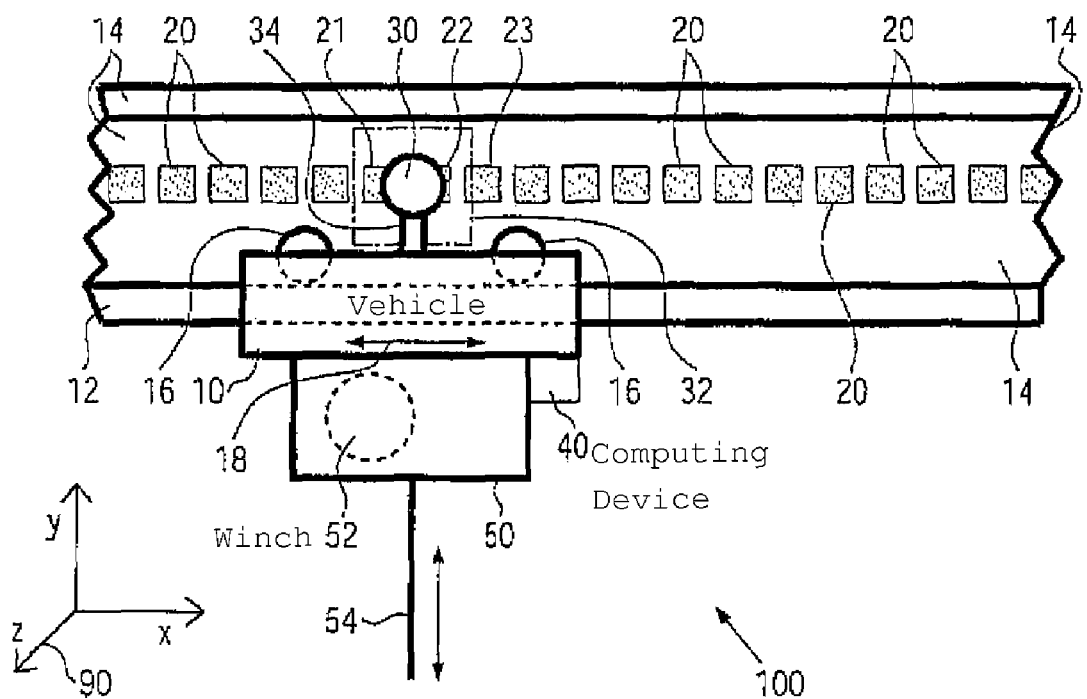
FIG. 1 a diagrammatic side view of an inventive apparatus on a crane trolley on a crane girder.

A use example for the inventive method and an inventive apparatus 100 is explained relative to FIG. 1. It is possible to see a vehicle 10, which is movable on a support 14 with the aid of runners or rollers 16 and a here not shown drive. Vehicles of the type shown in FIG. 1 are also known as crane trolleys. The support 14 forms a path 12 along which the vehicle 10 can move. The movement direction or main movement direction of the vehicle 10 is in FIG. 1 the x-direction and is indicated by a double arrow 18. In a substructure 50 of the vehicle 10 is positioned a diagrammatically shown cable winch 52 and by means thereof and using a cable 54 loads are loaded and transported. The spatial directions are indicated by a coordinate system 90.

The inventive apparatus 100 has as essential components a digital camera 30 and a computing device 40, to which the digital camera 30 is functionally connected, typically by connecting cables. In special variants the computing device 40 can also be integrated into the digital camera 30.

Digital camera 30 is rigidly connected to vehicle 10 by means of a bracket 34. A here substantially square detection range or area 32 of the digital camera 30 is also diagrammatically shown.

The inventive computer program and therefore the inventive method are processed in the inventively present computing device 40. A computer program product in the sense of the invention can in particular be the computing device 40 with the associated ROM.

An essential component of the presently described, inventive optical positioning system is constituted by a plurality of in particular different markers 20, which in the example shown are two-dimensional barcodes. These markers 20 are equidistantly provided along support 14. They are typically stuck-on strips printed with barcodes. In the situation shown, markers 21 and 22 are completely detected by the digital camera 30. A marginal area of the marker 23 is also detected.

The operation of the inventive apparatus and method will be explained relative to FIGS. 2 and 3.

Equivalent components carry the same reference numerals in all the drawings.

The inventive method is based on the standpoint of using for further evaluations data resulting from image processing and giving information on a y-deflection or a z-deflection. A y-deflection can e.g. result from a shift of the marker images within the detection area 32 of the camera 30.

This is explained with reference to FIG. 2, where a detection area 32 of a digital camera 30 is shown. The images 71, 72 of two barcodes are completely within the detection range 32 of the digital camera 30. The image 73 of a further barcode is half in the detection range 32 and the image 74 of a further barcode is completely outside detection range 32. The marker images 71, 72, 73, 74 are upwardly displaced in the example shown compared with the original positions, which are indicated by the reference numerals 81, 82, 83, 84. This is caused by a downward shift of digital camera 30, e.g. due to worn vehicle rollers. From a shift Δ of the marker images 71, 72, 73, 74 in the detection area 32 of the digital camera 30 a quantitative determination takes place according to the invention of a shift Δy of the vehicle 10 in the y-direction.

Thus, important measurement informations can be made available through the skilled operation of the components present.

Figure 2:
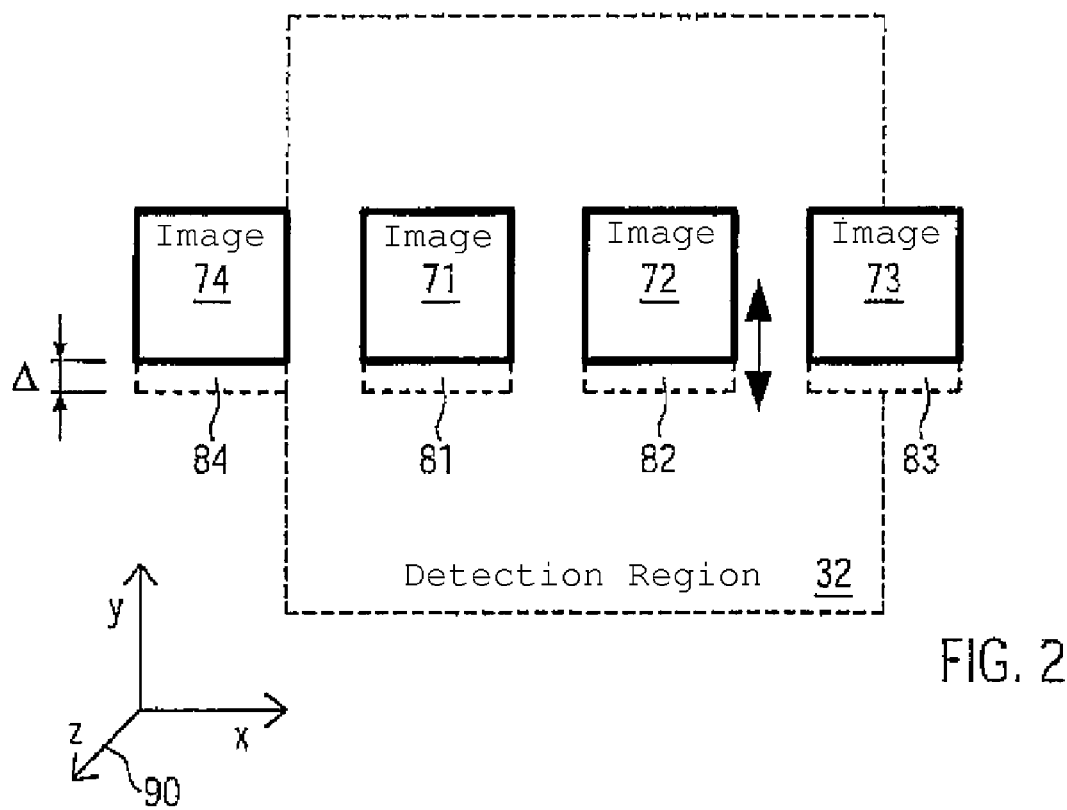
FIG. 2 a diagrammatic view of the detection range of a digital camera of an inventive apparatus for illustrating a first method variant.
Figure 3:
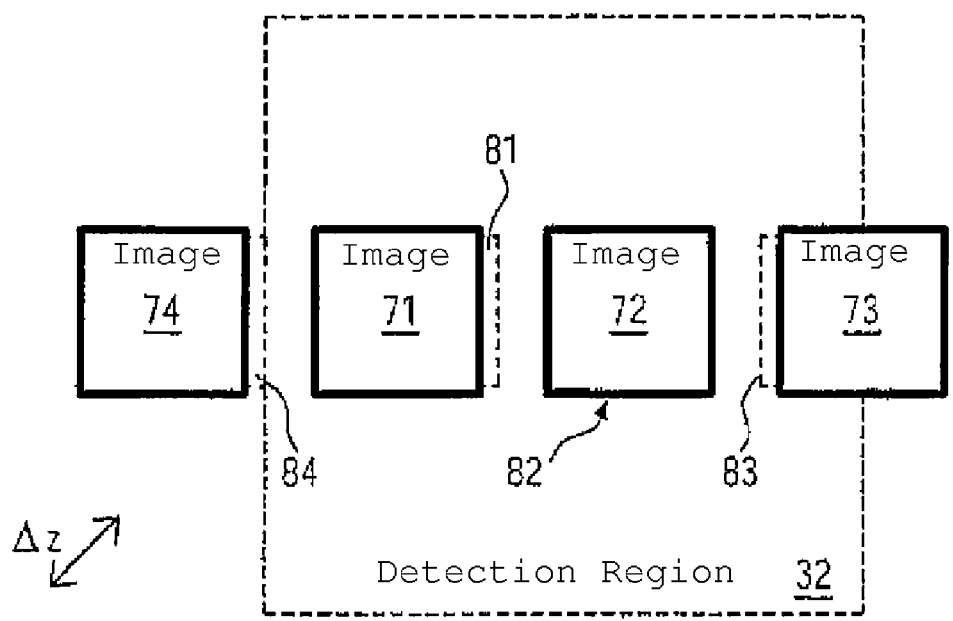
FIG. 3 a diagrammatic view of the detection range of the digital camera of an inventive apparatus for illustrating a second method variant.

The corresponding spatial directions are indicated by a coordinate system 90 in FIGS. 2 and 3.

With reference to FIG. 3 it is explained how a movement in the z-direction can be established. FIG. 3 shows a situation where the camera is nearer than normal to the barcodes 20. Correspondingly the barcode marker images 71, 72, 73, 74 are enlarged and also displaced with respect to the original images 81, 82, 83, 84. According to the invention a distance change Δz of the vehicle 10 in the z-direction is calculated from the established size change to the marker images 71, 72, 73, 74.

In order to obtain real positions, it is not absolutely necessary to calculate these positions geometrically from the image data. Instead the corresponding sizes of the marker images can be taught in several reference or teach-in runs for different z-distances. Use need then only be made of the corresponding tables for evaluation purposes.

From a y-deflection it is e.g. possible to determine the wear to the rollers of a suspended monorail and the latter can therefore undergo maintenance in good time prior to complete wear and therefore well before a failure occurs.

Figure 4:
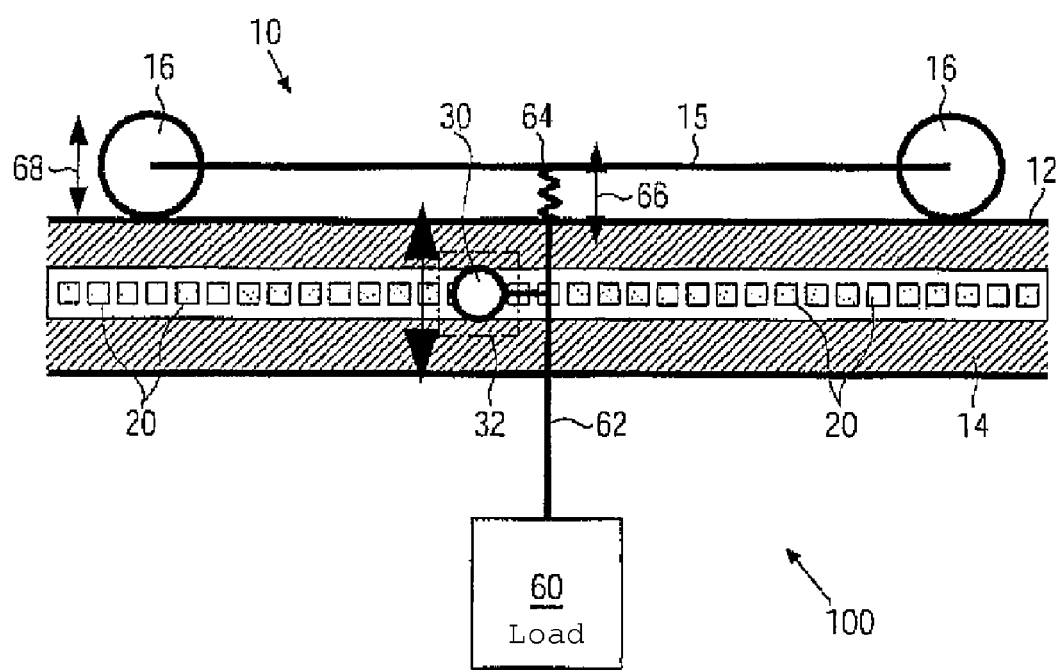
FIG. 4 another embodiment of an inventive apparatus.

This is explained relative to FIG. 4, which diagrammatically shows another embodiment of an inventive apparatus 100 on a vehicle 10. The vehicle 10, which in the present case is a suspended monorail, is set up for carrying loads 60 and can run on a support 14 with the aid of rollers 16. A digital camera 30 is mounted on a load arm 62 on which is suspended the load 60 to be transported. In the example shown the load arm 62 is connected by means of a spring 64 to a base frame 15 of vehicle 10, which can also be called a cage.

If the rollers 16 are subject to wear, the distance between base frame 15 and support 14 decreases and consequently the digital camera 30 is lowered relative to the support 14 and the barcodes 20. This lowering, indicated by double arrows 68 and 66 in FIG. 4, leads to an upward shift of the images of barcodes 20 in detection area 32, cf. FIG. 2. The y-position noted by the digital camera 30 is consequently proportional to a lowering of the vehicle 10 relative to the path 12.

By means of the y-position it is also possible to implement a weighing method. For this purpose the apparatus 100 can be so coupled to the vehicle 10, e.g. a suspended monorail, that the digital camera 30 is displaced with varying load 60. In the diagrammatic example shown digital camera 30 is coupled by means of a spring 64 to the base support 15 of the vehicle. Thus, the digital camera 30 moves downwards in proportion to the weight. If the load 60 is removed again, the digital camera 30 moves upwards again. The movement direction of the digital camera 30 when using the inventive apparatus 100 as a weighing means is indicated by the double arrow 66 in FIG. 4.

By means of this measuring method it is possible to use the determined diagnostic data for further purposes.

For example, for each run, particularly when a measuring system is put into operation for the first time, the positions of the particular barcode can be adjusted via the y-position and z-position.

With these two values it is possible for a complete installation to carry out very satisfactory monitoring against wear and ageing phenomena. In a reference run e.g. storage takes place of the y and z-positions for each x-position.

For each following run the then newly recorded data are compared with those of the reference run. If variations occur or the variations exceed predetermined tolerance intervals, a master computing or control device, e.g. a computer-programmable control unit, can be informed and during the next service interval the installation can be maintained in good time without there being any operational failure.

The present invention provides a novel method and a novel apparatus for determining the position of a vehicle. With the aid of fundamentally known components, here in a simple, reliable and fault-unsusceptible manner the position of vehicles is determined. Compared with the prior art much longer roadways are possible and a particular advantage is that it is also possible to detect and output variations from the normal path at right angles to a main movement direction. The invention has been described in detail hereinbefore for suspended monorails, but can be correspondingly used for other systems.

What is claimed is:

1. Method for determining the position of a vehicle moving along a path, markers being positioned along the path, wherein:

the markers are detected with a digital camera placed on the vehicle and that by means of image processing from a position of at least one marker image in a detection range of the digital camera, a determination takes place of a position of the vehicle relative to at least one of the markers in a main movement direction (x) of the vehicle along the path and in at least one direction (y, z) at right angles to the main movement direction (x), wherein a determination takes place of a weight of a load supplied to the vehicle on the basis of shifts (Δ) of marker images in the detection range of the digital camera.

2. Method for determining the position of a vehicle moving along a path, markers being positioned along the path, wherein:

the markers are detected with a digital camera placed on the vehicle and that by means of image processing from a position of at least one marker image in a detection range of the digital camera a determination takes place of a position of the vehicle relative to at least one of the markers in a main movement direction (x) of the vehicle along the path and in at least one direction (y, z) at right angles to the main movement direction (x), wherein the vehicle has rollers, and wherein wear to the rollers is determined on the basis of shifts (Δ) of marker images in the detection range of the digital camera.

3. Method according to claim 1, wherein position changes (Δy) of the vehicle at right angles to the main movement direction (x) of the vehicle are determined on the basis of shifts (Δ) of the marker images in the detection range of the digital camera.

4. Method according to claim 1 or 2 wherein distance changes (Δz) of the vehicle relative to the path are determined from changes in a size of the marker images.

5. Method according to claim 1 or 2, wherein at least one reference run is made, in which relative positions of the vehicle in at least one direction (y, z) at right angles to the main movement direction (x) associated with the relative positions of the vehicle in the main movement direction (x) are recorded and stored.

6. Method according to claim 1 or 2, wherein error signals are outputted if the values determined for the relative positions of the vehicle in directions (y, z) at right angles to the main movement direction (x) pass beyond predetermined tolerance intervals.

7. Method according to claim 1 or 2, wherein two-dimensional barcodes are used as the markers.

8. Method according to claim 1 or 2, wherein the markers are arranged in several rows along the path.

9. Method according to claim 1 or 2, wherein from the positions relative to individual markers for the vehicle absolute positions of said vehicle relative to the environment are determined on the basis of known positions of said markers with respect to the environment.

10. Computer program product with program code stored on a computer-readable storage device, for carrying out the computing and evaluating steps of a method according to one of the claim 1 or 2, when the computer program is performed on a computer functionally connected to the digital camera.

11. Apparatus for determining the position of a vehicle movable along a path comprising a digital camera placed on the vehicle for detecting markers positioned along the path, and a computing device set up for determining a position of the vehicle relative to at least one marker in a main movement direction (x) of the vehicle along the path and at least one direction (y, z) at right angles to the main movement direction (x) by means of image processing from a position of an image of at least one of the markers in a detection area of the digital camera, wherein the computing device is further set up for determining a weight of a load supplied to the vehicle on the basis of shifts (Δ) of marker images in the detection range of the digital camera.

12. Apparatus for determining the position of a vehicle movable along a path, comprising a digital camera placed on the vehicle for detecting markers positioned along the path, and a computing device set up for determining a position of the vehicle relative to at least one marker in a main movement direction (x) of the vehicle along the path and at least one direction (y, z) at right angles to the main movement direction (x) by means of image processing from a position of an image of at least one of the markers in a detection area of the digital camera, wherein the vehicle has rollers, and wherein the computing device is further set up for determining wear to the rollers based on shifts (Δ) of marker images in the detection range of the digital camera.

13. Apparatus according to claim 11 or 12, wherein the vehicle is intended for transporting loads and that the digital camera is coupled to a component of the vehicle, which is elastically deformable when the vehicle is subject to a load to be transported.

14. Apparatus according to claim 11 or 12 wherein the digital camera is coupled to a spring located on a base frame or base support of the vehicle.

* * * * *